(12) United States Patent
Buese et al.

(10) Patent No.: US 9,242,189 B2
(45) Date of Patent: Jan. 26, 2016

(54) CONTINUOUS EXTRACTOR, CONCENTRATOR AND DRYER

(71) Applicants: Mark A. Buese, Gainesville, FL (US); Rudy Strohschein, Micanopy, FL (US)

(72) Inventors: Mark A. Buese, Gainesville, FL (US); Rudy Strohschein, Micanopy, FL (US)

(73) Assignee: CONTINUOUS EXTRACTIONS, LLC, Micanopy, FL (US)

( * ) Notice: Subject to any disclaimer, the term of this patent is extended or adjusted under 35 U.S.C. 154(b) by 348 days.

(21) Appl. No.: 13/840,546

(22) Filed: Mar. 15, 2013

(65) Prior Publication Data
US 2014/0163247 A1 Jun. 12, 2014

Related U.S. Application Data

(60) Provisional application No. 61/736,211, filed on Dec. 12, 2012.

(51) Int. Cl.
*B01D 11/02* (2006.01)
*B01D 5/00* (2006.01)
*B01D 11/00* (2006.01)

(52) U.S. Cl.
CPC ........ *B01D 11/0219* (2013.01); *B01D 11/0284* (2013.01); *B01D 11/0296* (2013.01); *B01D 2011/007* (2013.01)

(58) Field of Classification Search
CPC .............. B01D 11/02; B01D 11/0219; B01D 11/0284; B01D 11/0296; B01D 2011/007
See application file for complete search history.

(56) References Cited

U.S. PATENT DOCUMENTS

| 2004/0089321 A1* | 5/2004 | Stone ............................... 134/2 |
| 2009/0050548 A1* | 2/2009 | Shirkhan ....................... 210/137 |
| 2009/0166175 A1* | 7/2009 | Waibel et al. .................. 203/49 |

\* cited by examiner

*Primary Examiner* — Katherine Zalasky

(74) *Attorney, Agent, or Firm* — Saliwanchik, Lloyd & Eisenschenk (57) ABSTRACT

Continuous extraction units are constructed having a plurality of extraction chambers containing extractable material. Without disruption of total fluid flow in the unit: an extraction chamber completely depleted of extract can be evacuated of solvent and replaced with an extraction chamber containing fresh extractable material. The extract is continuously separated from the solvent in an expansion chamber where it is continuously or periodically removed from the unit. All solvent can be retained within the unit. One or more compressors can be used to circulate the fluid through the extraction chambers, the expansion chamber, and a condenser, where the expansion chamber and the condenser can be coupled as a heat exchanger.

4 Claims, 7 Drawing Sheets

CONTINUOUS EXTRACTOR, CONCENTRATOR AND DRYER

BACKGROUND OF THE INVENTION

The extraction process has been used for centuries for the isolation of desirable materials. The process involves the mixing of a solvent with extractable material, separation of the solution that is formed, and removal of the solvent from the solute, a desired material.

U.S. Pat. No. 5,512,285, to Wilde, teaches a batch process for extraction of organic components from plant material. The process uses tetrafluoroethane as the extraction solvent. The process allows extraction of some desired components at near ambient temperatures, and is economical relative to super critical $CO_2$ extractions at high pressure. The system uses a tumbler to mix solvent and plant material in a sealed extractor, which is connected to an evaporator that is warmed in an immersion bath with a heater, the evaporator is connected to a compressor to effectively remove and retain the majority of the expensive solvent and return it to the extractor, if needed. The evaporator was the receiver for the extract, which when the evaporator dropped in pressure to zero psig the evaporator was opened and the extract drained from the evaporator. The evaporator is then connected to the compressor and heated to recover virtually all the solvent.

Hence, a flexible system permitting extraction that retains solvent nearly quantitatively, is cost effective, energy efficient, and can permit an effectively continuous operation is desirable.

BRIEF SUMMARY OF THE INVENTION

A continuous unit for the extraction of a desired product from plant or other extractable material is presented that allows the isolation of the product in a concentrated form, the recycling of the extraction solvent, and the drying of the extracted plant material while all are fully contained within the unit. The isolated extract is continuously removed from the unit. The unit employs a plurality of extraction chambers such that one extraction chamber is removed and replaced without halting the extraction process in other extraction chambers.

DETAILED DESCRIPTION OF THE INVENTION

Embodiments of the invention are directed to a continuous immersion extraction system. The extraction system consists of a unit comprising a plurality of extraction chambers that are individually addressed. The extractable material can be plant material or any other extractable material that, generally, can be handled as a solid. Sludge or liquid can be adapted for use in the continuous immersion extraction system. Throughout this disclosure, the extractable material is referenced to as plant material, but it is to be understood that other extractable material can be employed. The extraction system employs a separation chamber, which is an expansion chamber, where a solvent from a solution is vaporized, with the formation of an aerosol from one or more solutes that consolidates into an extract. The extraction chambers are independently: in a state of having plant material being extracted by a solvent, wherein the desired extract is a solute of a solution that is formed; in a state of being washed of residual solute and solution residing in the vicinity of the extracted material; in a state of removal of residual solvent, such that the extracted (spent) plant material can be prepared for removal from the unit; or in a state of being removed from the unit and replaced with an equivalent extraction chamber containing fresh plant material for extraction. The extraction system retains nearly all solvent within the system without losses of almost no solvent to the environment. The extraction system allows the continuous removal of the extract from the system. The extraction process is carried out in a manner where energy consumption is minimized, spent plant material is easily and safely disposed of as waste or employed as a useful by-product, and all other material is recycled solvent or the desired extract. The system can be constructed to couple heat absorbing and heat releasing portions of the system as a heat exchanger, which minimizes energy consumption.

Figure 1:
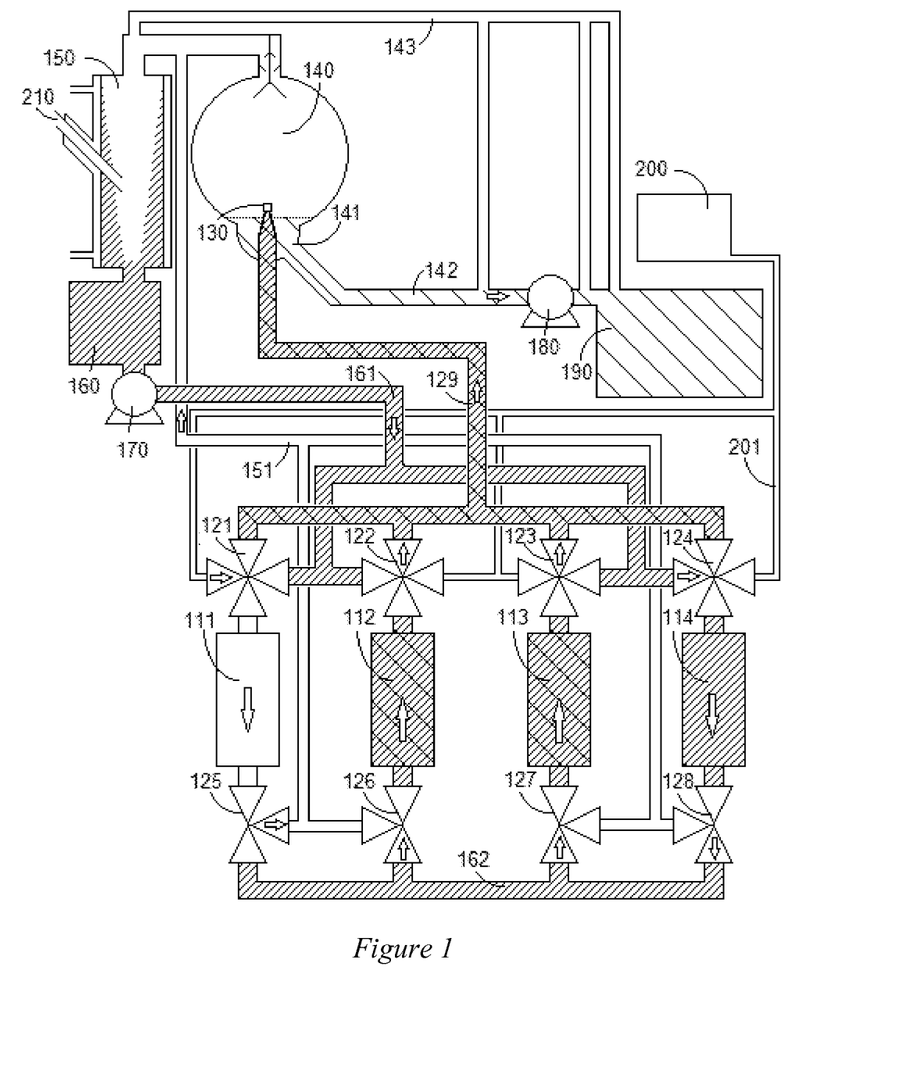
FIG. 1 shows a schematic drawing of a continuous extraction system particularly suited for extraction solvents that are liquids at STP and employs a vacuum separation chamber, according to an embodiment of the invention.

In an embodiment of the invention, as illustrated, but not limited by, FIG. 1, a plurality of equivalent extraction chambers 111, 112, 113, and 114 contain plant material, where all but one of the extraction chambers 112, 113, and 114 experiences flow of an extraction solvent. The remaining extraction chamber 111 is in a state of being prepared for exchange or being exchanged with an equivalent extraction chamber containing fresh plant material. The extraction solvent is retained within the system and the desired extract is continually removed from the system as a neat or highly concentrated form. In embodiments of the invention, the extract solution flows through at least one nozzle 130 into a low-pressure separation chamber 140 where the extraction solvent is separated as a volatile from the solute comprising the desired extract. At least one filter resides at the exit of each extraction chamber 111, 112, 113, and 114 and/or the conduit 129 connecting the extraction chamber to the nozzle 130 and separation chamber 140 such that the plant material does not exit the extraction chambers 111, 112, 113, and 114 or fines that can clog a nozzle 130 are not discharged into the system. The separation chamber 140 has a port 141 through which the extract, the solute of the extraction solution, is removed from the system in a continuous manner, optionally, by use of a pump 180. Optionally, depending on the pressure and solvent volatility, the separation chamber and/or the piping preceding the nozzle 130 can include a means for heating.

The separation chamber 140 is maintained at a lower pressure than that of the extraction chambers and can be, but is not necessarily, under vacuum, as illustrated in FIG. 1. The separation chamber 140 promotes solvent vaporization to separate the solvent from the extract as a neat solute or a highly concentrated solution. The extract flows under the influence of gravity and collects at port 141 where removal from the extractor system is carried out in a continuous manner using a pump 180 or where a receiver 190 is filled by gravity induced flow without pump 180. When a highly concentrated solution is removed, most, if not all, of the remaining solvent can be recovered and returned to the extraction system through an optional conduit 143 that is connected to: receiver 190; a conduit between the pump 180 and the receiver 190; and/or within a conduit 142 between the port 141 and the pump 180.

The extraction solvent vaporized in the separation chamber is reverted to the condensed phase using a condenser 150 for reintroduction of the extraction solvent into the extraction chambers for further extraction of plant material. Fluid is transmitted through the system by a positive displacement pump 170. The low pressure of the separation chamber 140 can be maintained by a vacuum pump connected at a port 210 to a chilled condenser 150 where the vaporized solvent is condensed before the inlet side of the positive displacement pump 170. Optionally, a solvent reservoir 160 is situated between the condenser 150 and the pump 170 inlet.

In an embodiment of the invention, the system includes a multiplicity of extraction chambers 111, 112, 113, and 114 that have valves or combinations of valves situated at the solution exit of the extraction chambers, 121, 122, 123, and 124, and valves or combinations of valves at the opposite end of the chambers, 125, 126, 127, and 128. As illustrated in FIG. 1, for example, solvent from receiver 160 is pumped through conduit 161 and directed through valve 124 into extraction chamber 114. Extraction chamber 114 contains plant material from which a large proportion of the extract solute has been removed, which results in a rapidly decreasing concentration of extract in the solution and ultimately solvent flowing from extraction chamber 114 through valve 128 into conduit 162. Although FIG. 1 shows fluid flow from the top to the bottom of extraction chamber 114, it should be understood that the system is easily plumbed to cause that flow to be from the bottom to the top of extraction chamber 114. From conduit 162, the dilute solution or solvent, is directed into extraction chambers 112 and 113 through valves 126 and 127, respectively. The flow rate in extraction chamber 114 is approximately double that of experienced individually in extraction chambers 112 and 113, as illustrated in FIG. 1. The relative flow rate depends on the number of extraction chamber in the state illustrated for extraction chamber 114 versus the number of extraction chamber in the state illustrated for extraction chamber 113, and generally, a system running at it highest efficiency will have significantly more in the state of extraction chamber 113. Upon exit of the concentrated solution from extraction chambers 112 and 113 through valves 122 and 123, respectively, flow is directed through conduit 129 to the nozzle 130 within the separation chamber 140. While the fluid flow has been directed, as indicated, through extraction chambers 114, 112, and 113, extraction chamber 111, which contains completely extracted plant material, is in a state of being prepared for replacement with an equivalent extraction chamber. FIG. 1 illustrates one manner in which this exchange preparation can be carried out by aligning valves 121, as shown, and 125, contrary to what is shown, to admit a gas, for example, nitrogen, from a gas reservoir 200 through a gas line 201 to force the solvent into conduit 151. When all solvent, except that wetting residual plant material, has been removed from extraction chamber 111, valve 125, as shown, is aligned to direct nitrogen and solvent vapor to conduit 151, which directs the solvent vapors to condenser 150, allowing the spent extracted material to be dried before removal from the unit. Valve 121 can be aligned as indicated or may be partially or completely shut off where the pressure drops in extraction chamber 111, which also promotes drying of the spent plant material therein.

Upon removal of all, or nearly all of, the solvent from extraction chamber 111, it is isolated from the system by closing valves 121 and 125, and removed from the system. Subsequently, an equivalent freshly loaded recycled extraction chamber 111 is placed in the system and has its valves aligned as are the valves of extraction chambers 112 and 113. Eventually, the more extract depleted extraction chamber, either 112 or 113, has its valves, either 122 and 126 or 123 and 127, aligned for fluid flow from solvent conduit 161 to 162. Extraction chamber 114 is aligned using valves 124 and 128 to be in communication with gas line 201 in the manner that extraction chamber 111 was previously aligned before exchange. In this manner, as shown in FIG. 1, at least one extraction chamber delivers solvent or a dilute solution to all but one of the other extraction chambers in the system and the remaining extraction chamber is being dried for replacement. Alternatively, conduit 161 can be directly connected to conduit 162, not shown, and all extraction chambers not in a state of drying, can be in a state of extraction, as shown for extraction chambers 112 and 113, in FIG. 1. Conveniently and efficiently, at least one additional extraction chamber can be outside of the system being emptied of extracted material and reloaded with fresh extractable material for introduction into the system. Although four extraction chambers are illustrated in FIG. 1, the system can employ 3, 5, 6, 7, 8, 9, 10 or more extraction chambers, where the majority are in the state shown for extraction chambers 112 and 113, at least one can be in the state of extraction chambers 114, and at least one is in the state of extraction chambers 111.

In addition to those components illustrated in FIG. 1, in embodiments of the invention, as desired, connectors, for example, quick release connectors can be included within the system. Additionally, as desired, filters, heaters, chillers, heat exchangers, sampling ports, solvent input ports, level indicators, shutoff valves, isolation valves, flow meters, temperature gauges, and sensors for fluid analysis can be included in the system. In addition to the redundancy of extraction chambers, a redundancy of conduits, filters, liquid pumps, receivers, separation chambers, condensers, and vacuum pumps can be included in the system, as is readily appreciated by those skilled in the art. The system can be automated by interfacing fluid sensors, level indicators, valves, pumps, heaters and chillers to a computer with programmed of technician inputted parameters for control of the system. The extraction plant can employ a plurality of these systems, where, for example, a common solvent receiver, gas source, vacuum source, and product receiver may be shared, as desired, between the plurality of systems. It is envisioned that the extraction chambers are of a size that can be readily removed and replaced by one or more technicians, as needed, without or with the aid of equipment such as forklifts, jacks and/or other mechanical equipment, as can be appreciated by those skilled in the art. All conduits, filters, gauges, pumps, or other components can be plumbed to permit their emptying and evacuation for exchange without stopping the continuous extraction system. For example, a pair of filters can be plumbed in parallel with valves that permit isolating a clogged filter, draining the filter into the system, evacuating the filter, and replace the filter while the system is processing extract. The temperature at which the solvent is introduced into the extraction chambers can be controlled by employing a heater, chiller, or other heat exchanger in the solvent reservoir or the conduits situated prior to flow into the extraction chambers. The extraction chambers can be jacketed and can have a heating or cooling fluid circulated through the jacket.

Solvents that can be used in a system as illustrated in FIG. 1, include water, alcohols, hydrocarbons, ethers, fluorinated or other halogenated hydrocarbons, esters, amines, carboxylic acids or any other solvents that are readily vaporized at temperatures of about 25° C. to about 250° C. at pressures from about 760 mm Hg to about 1 mm Hg. Among the solvents that can be used include, but are not limited to, acetaldehyde, diethyl ether, pentane, ethyl bromide, methylene chloride, carbon disulfide, cyclopentane, acetone, methyl acetate, chloroform, methanol, tetrahydrofuran, hexane, carbon tetrachloride, ethyl acetate, ethanol, benzene, cyclohexane, propanol, ethylene dichloride, heptane, dioxane, water, formic acid, toluene, butanol, octane, ethylene bromide, acetic acid, chlorobenzene, propionic acid, xylene, nonane, bromobenzene, turpentine, furfurol, butyric acid, dimethyl formamide, dimethyl acetamide, dimethyl sulfoxide, decane, phenol, aniline, propylene glycol, ethylene glycol, acetonitrile, pyridine, or any other solvent. Depending on the solvent employed, the unit can be constructed out of metal, glass, ceramic, or plastic. Depending on the use of the extract produced, the solvent should be carefully considered for the effect of any trace amounts of solvent in the extract to consider the appropriateness of its use. Mixtures of solvents may be employed, for example a mixture of solvents with similar volatilities or in a composition where they form an azeotrope.

Figure 2:
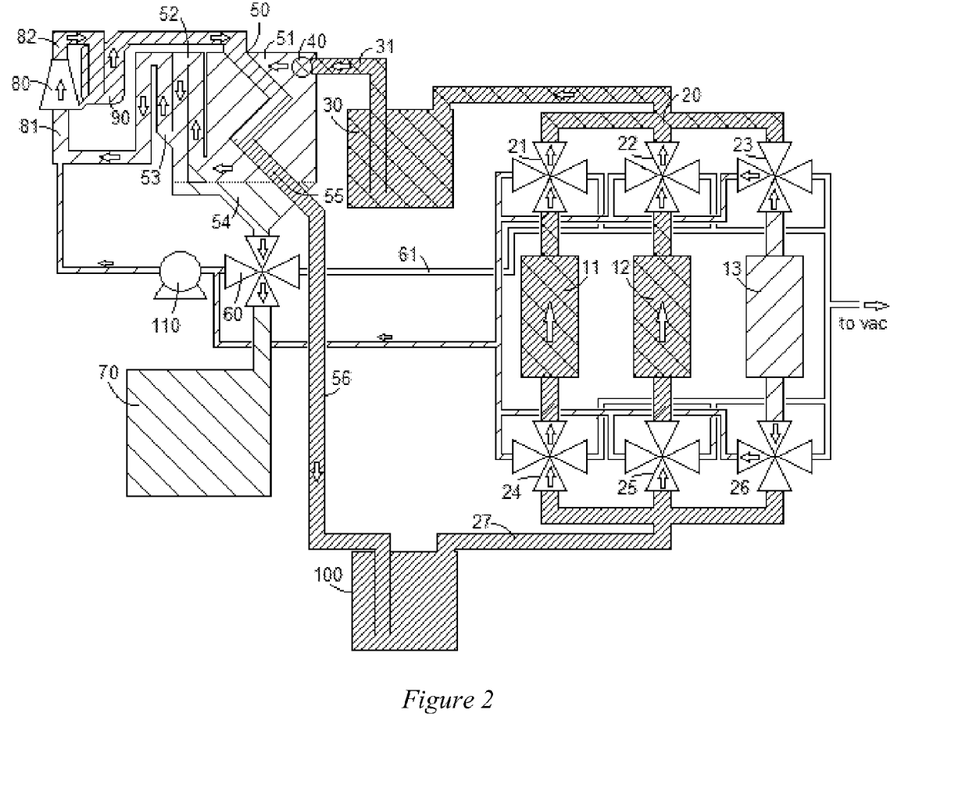
FIG. 2 shows a schematic drawing of a continuous extraction system particularly suited for extraction solvents that are gases at STP and employs pressures in excess of ambient atmospheric pressure, according to an embodiment of the invention.

In another embodiment of the invention, the continuous extraction system is designed to employ solvents that are gases at typical room temperatures at one atmosphere, such as, but not limited to, fluorocarbons where all extraction and separation portion of the system is carried out at pressures above ambient atmospheric pressure. As shown in FIG. 2, liquid solvent under high pressure transports from a first, optional, receiver 100 via conduit 27 through valves 24 and 25 into extraction chambers 11 and 12 that contain plant material. Valves 21 and 22 are aligned to direct liquid solution to conduit 20 to a second, optional, receiver 30. Typically, although not shown, at least one filter is present at exits to all extraction chambers 11, 12 and 13, and/or in conduits 20 and/or 31. Although, one or both of the receivers can be used to compensate for fluctuations in the volume of liquid contained in the extraction chambers, in principle, the system can function without a reservoir. High-pressure liquid solution from receiver 30 flows to thermal expansion valve 40 and into a low-pressure expansion chamber 51 of heat exchanger 50, where the solution disproportions into a solvent vapor and an aerosol of the liquid extract with the absorption of heat. The aerosol impinges on the internal surfaces of the expansion chamber 51 coalesces and drains to a collection port 54, at a low portion of the expansion chamber 51. The low-pressure solvent vapor travels through the low-pressure side of the heat exchanger through traps 52 and, optionally, 53, which, although shown in FIG. 2 with a serial geometry, a plurality of traps may be in parallel or may be baffles within the expansion chamber 51. All trapped extract drains to the collection port 54 where it flows through valve 60 to extract receiver 70. The low-pressure vapor solvent flows through conduit 81 to the inlet of compressor 80, where the low-pressure vapor solvent is compressed to high-pressure vapor solvent. The high-pressure vapor flows through an optional oil trap 90, when a compressor that employs oil is used. The oil used at the compressor 80 can be the extract to avoid contamination by a lubricant. The high-pressure vapor transports through conduit 82 into the high-pressure side of heat exchanger 50, which is condenser 55. Heat is released from the high-pressure vapor in the condenser 55 to the expansion chamber 51 resulting in the condensation of the high-pressure solvent vapor to liquid solvent in the condenser 55 of the heat exchanger 50. The liquid solvent exits the condenser 55 where the liquid solvent flows through conduit 56 and to the solvent receiver 100, from which the extraction chambers 11, 12, and 13 are filled with solvent.

The system is configured to employ a plurality of extraction chamber, illustrated with three extraction chambers 11, 12, and 13 in FIG. 2, where at least one of the extraction chambers, illustrated with extraction chambers 11 and 12 in a state of extraction by the positioning of valves 21, 22, 24, and 25 to transmit liquid solvent from receiver 100 through conduit 27 and into and ultimately through extraction chambers 11 and 12. The remaining extraction chambers, illustrated in FIG. 2 by the single extraction chamber 13, where valves 23 and 26 are aligned to vaporize to solvent and force the vapor solvent into the conduit 81. Upon reducing the pressure in extraction chamber 13 to the low pressure of the system, if pump 110 cannot pump the extraction chamber 13 to atmospheric pressure or below, valves 23 and 26 can be aligned to vent to normal atmospheric or to vacuum in a manner to collect the last residual solvent from the extracted plant material before removing extraction chamber 13. Extraction chamber 13 is replacing with a recycle extraction chamber containing fresh plant material. Upon introducing the replacement extraction chamber 13, valves 23 and 26 are aligned to remove air via a vacuum source before opening replacement extraction chamber 13 into the system.

The extract drained from the traps 52 and 53 and expansion chamber 51 into the collection port 54 of the heat exchanger 50 is drained, or otherwise transported, to extract receiver 70 through valve 60. When the extract in the receiver 70 contains solvent, valve 60 can be aligned to vent solvent vapor through pump 110 to the conduit 81. Subsequently, valve 60 can be aligned to remove final traces of solvent through conduit 61 to a vacuum source for collection.

In addition to those components illustrated in FIG. 2, in embodiments of the invention, as desired, connectors, for example, quick release connectors can be included within the system. Additionally, as desired, filters, heaters, chillers, additional heat exchangers, sampling ports, solvent input ports, level indicators, shutoff valves, isolation valves, flow meters, and sensors for fluid analysis can be included in the system. In addition to the redundancy of extraction chambers, a redundancy of conduits, liquid pumps, receivers, separation chambers, condensers, and vacuum pumps can be included in the system, as is readily appreciated by those skilled in the art. The system can be automated by interfacing fluid sensors, level indicators, valves, pumps, heaters and chillers to a computer with programed of technician inputted parameters for control of the system. The extraction process can employ one or more systems, where, for example, a common solvent receiver, gas source, vacuum source, and product receiver may be shared, as desired, between a plurality of units. It is envisioned that the extraction chambers are of a size that can be readily removed and replaced by one or more technicians, as needed, without or with the aid of equipment such as forklifts, jacks and/or other mechanical equipment, as can be appreciated by those skilled in the art.

Solvents that can be used are freons, for example, but not limited to, trifluoromethane, difluoromethane, fluoromethane, pentafluoroethane, pentafluorodimethyl ether, 1,1,2,2-tetrafluoroethane, 1,1,1,2-tetrafluoroethane, Bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, 1,1,2,2,3-pentafluoropropane, pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, 1,1,3-trifluoropropane, 1,1,1,3,3-pentafluorobutane, 1,3-difluoropropane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,3-trifluoropropane, 1,3-difluoropropane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,2,2,3-pentafluoropropane, 1,1,1,3,3-pentafluoropropane, 1,1,3-trifluoropropane, 1,1,3-trifluoropropane, 1,3-difluoropropane, 2-(difluoromethyl)-1,1,1,2,3,3-hexafluoropropane, 1,1,2,2,3,3,4,4-octafluorobutane, 1,1,1,2,2,4-hexafluorobutane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1,2,3,3,4,4-octafluoro-2-(trifluoromethyl)butane, 1,1,1,2,2,3,3,4,4,5,5-undecafluoropentane, 1,1,1,2,2,3,4,5,5,5-decafluoropentane, 1,1,1,2,2,3,3,5,5,5-decafluoropentane, 1,1,1,4,4,4-hexafluoro-2-(trifluoromethyl)butane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 1,1,1,2,2,3,3,4,4,5,5,6,6-tridecafluorohexane, 1,1,1,2,2,5,5,5-octafluoro-4-(trifluoromethyl)pentane, 1,1,2,2-tetrafluorocyclobutane, 3,3,4,4,5,5,6,6,6-nonafluoro-1-hexene, 1,1,1-trifluoroethane, pentafluoroethane, or any mixture thereof. In other embodiments of the invention, the solvent can be a non-freon, such as methyl ether, butane, propane, ammonia, or sulfur dioxide.

The compressor can be of any design and can be one that requires oil or is oil-free. If oil is employed in the compressor, the oil can be of any type, including, but not limited to, hydrocarbon, fluorocarbon or silicone oil.

The system can be used with pressures that are higher than normal air pressure, 14.7 psi. For example, the low-pressure side of the compressor may be 20 to 50 psi and the high-pressure side of the compressor may be 50 to 200 psi. Materials of construction for the extraction unit are those, which may contain pressures in excess of the highest pressure of the system. For example, metal or metal alloys are useful materials of construction, although other materials may be used when they are capable of withstanding the high pressures of the system.

Figure 3:
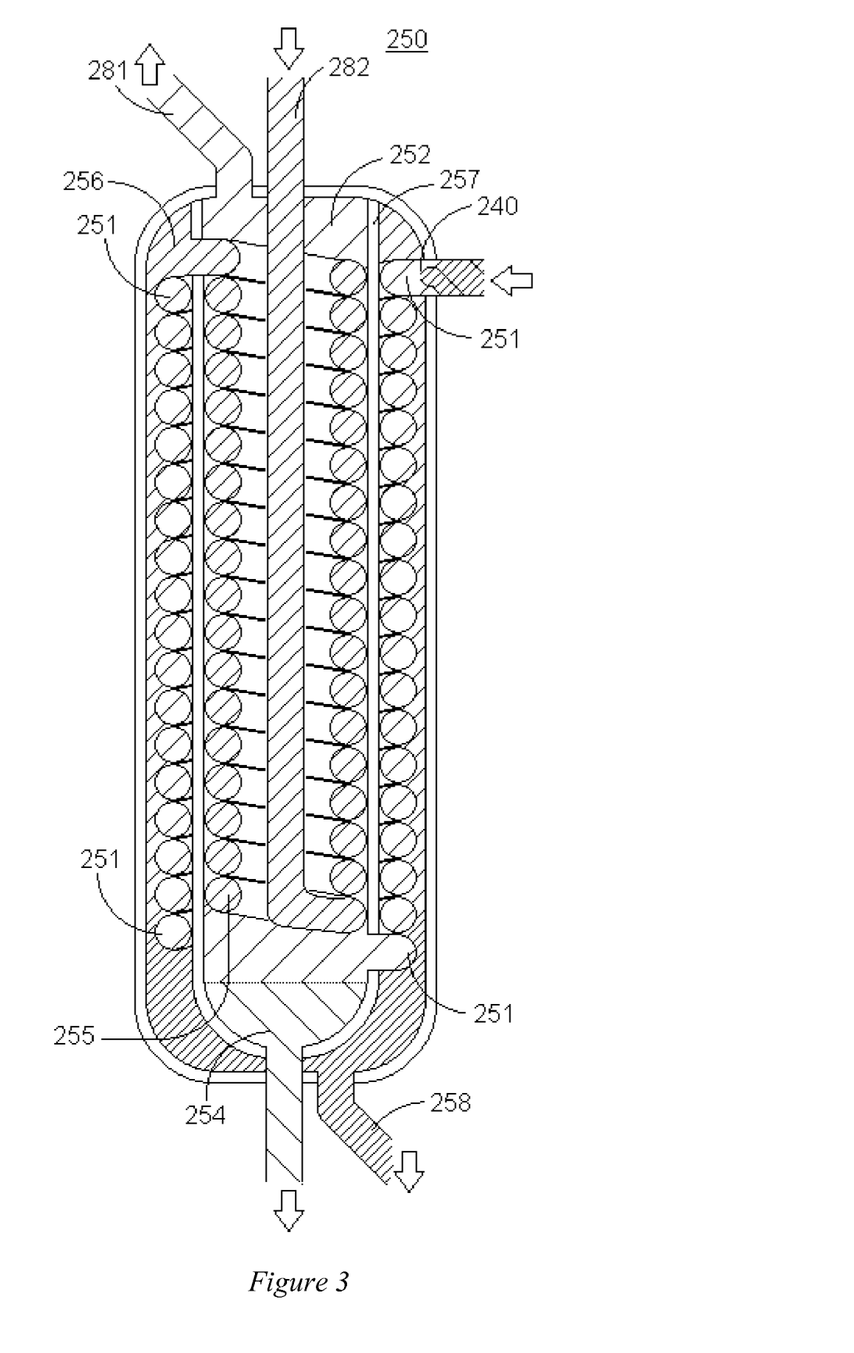
FIG. 3 shows a cross-section of a heat exchanger that combines the separation chamber and the condenser of the continuous extraction system, according to an embodiment of the invention.

Although many different designs may be used, the cross-section of a heat exchanger 250 is shown in FIG. 3. In this heat exchanger 250, hot high pressure vapor enters the top of the heat exchanger 250 from conduit 282 and circulates through a coiled first portion of condenser 255 from the bottom of a trap 252 where the coils intimately contact the inside of a cylindrical heat sink 257. Heat sink 257 transfers the heat from this coiled first portion of condenser 255 to the coiled expansion chamber 251 on the outside of cylindrical heat sink 257. The thermal expansion valve 240 delivers an aerosol from the solution formed in extraction chambers to the coiled expansion chamber 251 where vaporization of the solvent occurs with the absorption of heat from the heat sink 257. The heat sink 257 is heated by the hot and condensing high-pressure vapor, which, after rising through the first portion of condenser 255, enters a second portion of the condenser 256, where the high-pressure solvent vapor and/or liquid solvent flows over the coiled expansion chamber 251. Any high-pressure solvent vapor completely condenses in this second portion of the condenser 256 and flows into the exit conduit 258, as shown in FIG. 3. Alternatively, as needed, cooled high-pressure solvent vapor from the second portion of the condenser 256 can lead to an additional third portion of the condenser, not shown, where additional cooling is provided to condense the solvent vapor into liquid solvent. The fluid extract drains to a collection port 254 and the solvent vapor rises through the trap 252 chamber around the first portion of condenser 255 exiting into the low pressure solvent vapor conduit 281 that ultimately leads to a compressor.

Figure 4:
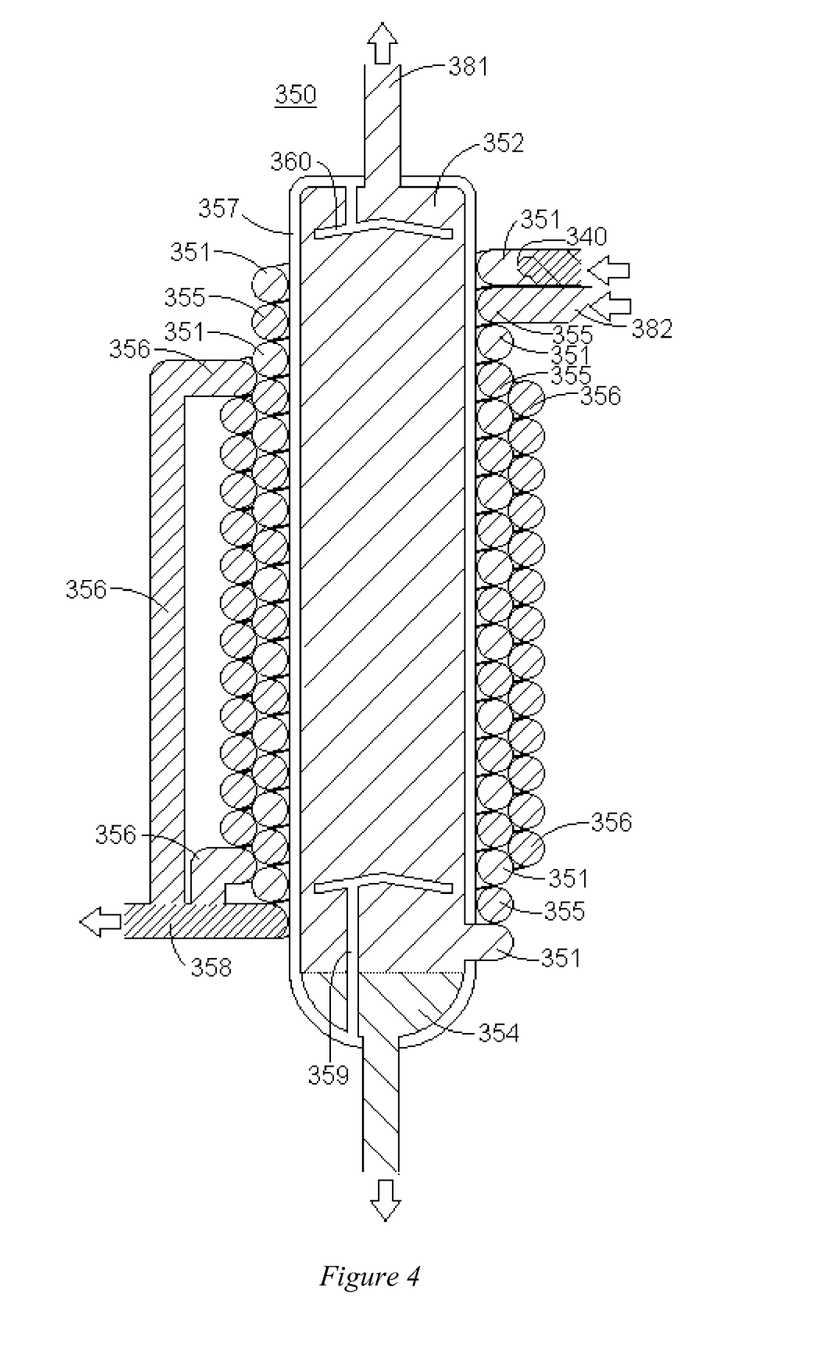
FIG. 4 shows a cross-section of a heat exchanger that combines the separation chamber and the condenser of the continuous extraction system, according to an embodiment of the invention.

Another heat exchanger 350 that can be used, in a continuous extraction system according to an embodiment of the invention, is shown in FIG. 4. In this heat exchanger 350, hot high-pressure vapor enter the top of the coiled condenser 355 of the heat exchanger 350 from conduit 382. The coiled condenser 355 spirals from the top of the heat exchanger 350 in intimate contact with a heat sink 357 and the coils of expansion chamber 351, where the coiled condenser 355 and expansion chamber 351 alternate as they proceed downward along heat sink 357. The thermal expansion valve 340 delivers an extract solution into the expansion coil 351 where vaporization of the solvent of the solution occurs with the absorption of heat from the contacting coiled condenser 355 and the heat sink 357. The high-pressure solvent vapor condenses in this coiled condenser 355 and flows into the exit conduit 358, as shown in FIG. 4. Any equilibrium high-pressure solvent vapor can enter an exterior coiled second portion of the condenser 356 where the solvent vapor is further cooled by the external environment or, as desired, by a second cooling source to assure condensing of the solvent vapor into liquid solvent. The fluid extract drains to a collection port 354 and the low pressure solvent vapor rises through the trap 352 chamber around the heat sink 357 exiting into the low pressure solvent vapor conduit 381 that ultimately leads to the compressor. To assure that extract is not entrained as an aerosol to the compressor; baffles 359 and 360 are constructed, but are not necessarily required, near the entrance and exit of the low-pressure vapor into trap 352.

Figure 5:
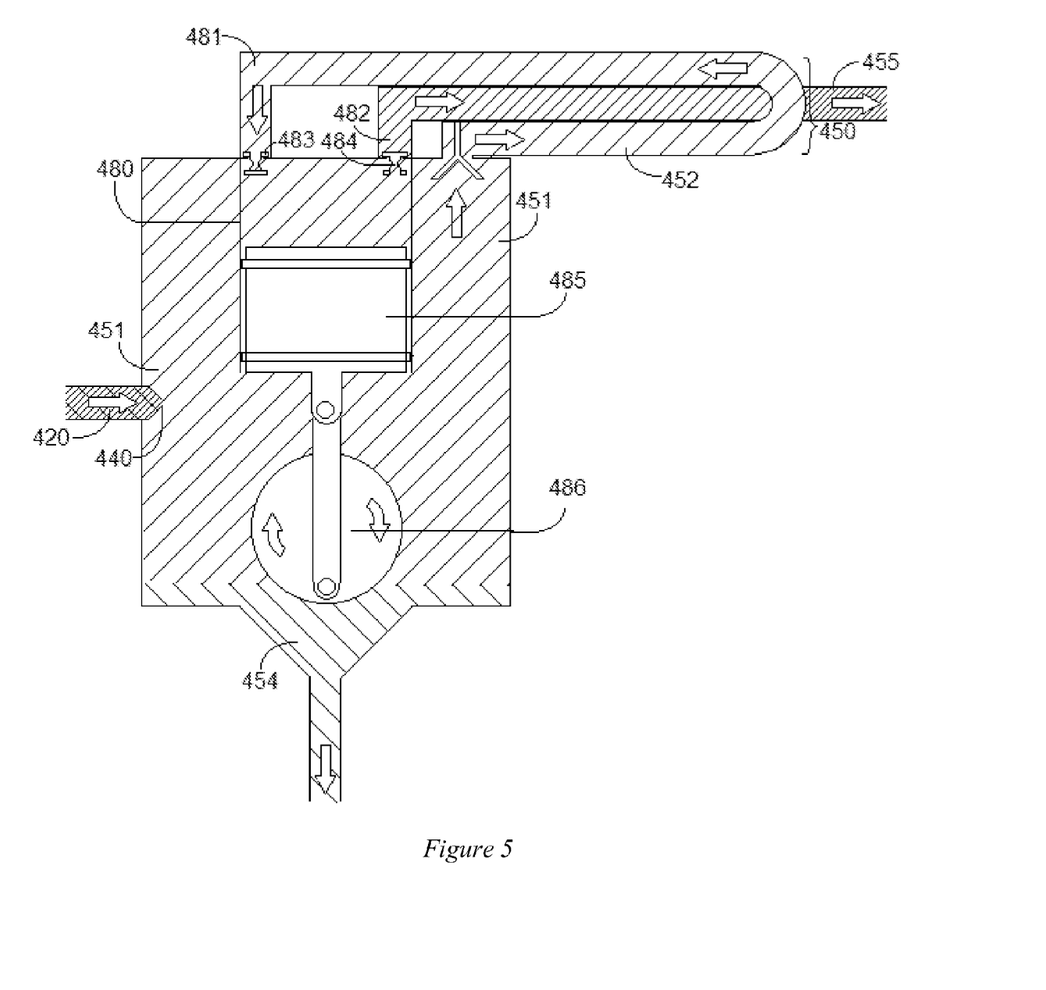
FIG. 5 shows a cross-section of a heat exchanger combined with a compressor where the crankcase of the compressor is included as a first portion of the separation chamber of the heat exchanger of the continuous extraction system, according to an embodiment of the invention.

As shown in FIG. 5, the compressor 480 can be combined with the heat exchanger 450, which permits the cooling of the compressor 480 in addition to cooling the hot high-pressure solvent vapor. Although the illustrated compressor is a piston driven reciprocating compressor, many types of compressors can be used, including, but not limited to rotary vane, diaphragm, scroll, and roots compressors. An oil-free compressor can be used or a compressor that requires a lubricant can be used. A conduit 420 delivers the extract solution from extraction chambers to the expansion valve 440 to the crankcase of the compressor, which constitutes a first portion of the expansion chamber 451, where the extract separates from the low-pressure solvent vapor and the extract drains to the collection port 454 at the base of the compressor. As shown in FIG. 5, the extract also functions as the lubricant for the crankshaft 486 of compressor 480, where the cooling by the expanding solvent vapor in the expansion chamber 451 keeps the temperature below the thermal decomposition temperatures of the extract. The low-pressure vapor then enters a second portion of the expansion chamber 451, where the fluid is delived to a conduit 452 that contacts the condenser 482 of the heat exchanger 450 after the high-pressure solvent vapor exits the compressor 480 when forced through an exit check valve 484 upon the up-stroke of piston 485. Although FIG. 5 shows heat exchanger 450 as straight touching conduits 452 and 482, the heat exchange of this geometry is not required. As the warm high-pressure solvent vapor proceeds through the conduit 482 it condenses and exits the heat exchanger 450 as a liquid solvent in an exit conduit 455. Heat is exchanged to the cool low-pressure solvent vapor in conduit 452 connected to the expansion chamber 451 in heat exchanger 450 where it is drawn through the entrance conduit 481 though the entrance check valve 483 on the down-stroke of piston 485 of compressor 480.

Figure 6:
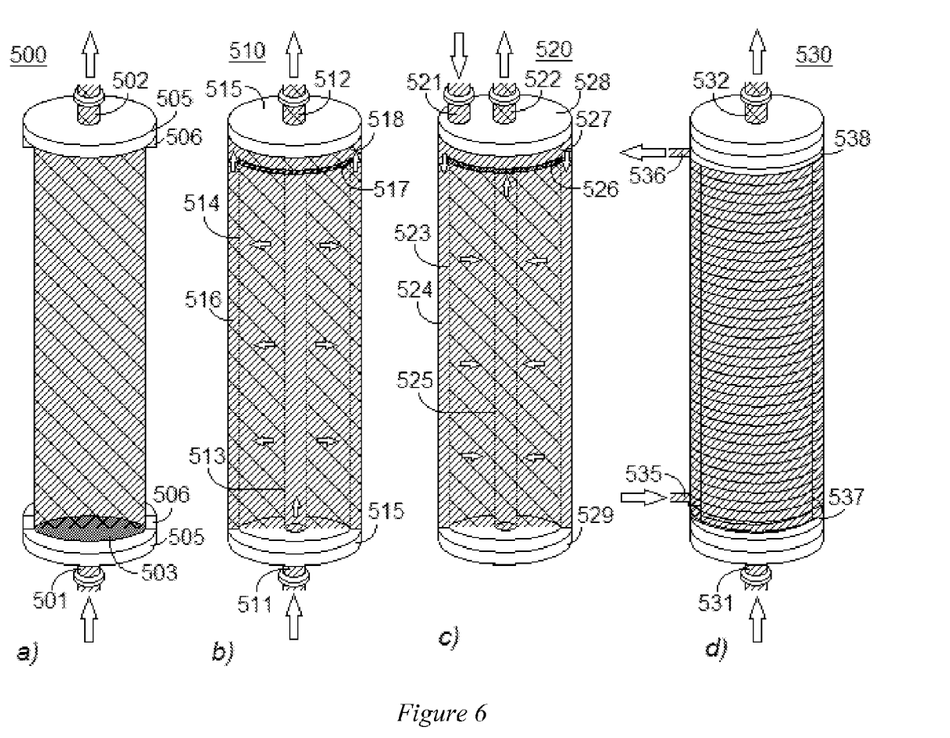
FIG. 6 shows a cross-section of a) an extraction chamber where the extraction solvent flows from the bottom to the top of the exchanger, b) an extraction chamber where the extraction solvent flows from the center to the periphery of the extraction chamber, c) an extraction chamber where the extraction solvent flows from the periphery to the center of the extraction chamber, and d) an external view of an extraction chamber with a jacket for heating or cooling of the contents of the extraction chamber for use in a continuous extraction system, according to an embodiment of the invention.

The extraction system, according to embodiments of the invention, is configured to employ a plurality of extraction chamber. FIG. 6 illustrates some, but not all, possible extraction chamber designs that can be included into the extraction system. FIG. 6*a*) shows a simple cylindrical extraction chamber 500 where an inlet 501 feed solvent through a filtering and fluid distributing screen 503. The extract solution is formed as the fluid is carried through the plant material housed in the cylindrical extraction chamber 500 and exits through a second filtering screen, not shown, which is equivalent to screen 503 at outlet 502. As can be appreciated upon consideration of FIG. 1, the fluid can be passed with a flow opposite of that illustrated in FIG. 6*a*). The ends of extraction chamber 500 can be fixed by coupling a capping portion 505 to an end, shown with an optional flange 506, to allow the removal of the caps 505 and the screens 503. By exposing the entire central cylinder of the extraction chamber 500, simple removal of the spent plant material is possible, leaving an empty open cylinder that can be refilled after fixing one of the caps 505 and screens 503.

FIG. 6*b*) shows a second configuration of a extraction chamber 510, where the solvent enters through the inlet 511 and enters a porous fluid distribution tube 513 closed by an impervious disc 517 at the end of tube 513 distal to inlet 511, which forces the fluid flow radially through the plant material from the central fluid distribution tube 513. The extract solution is forced through a filtering porous inner wall 514 of a jacket 516 where the extract solution is forced to consolidate at a consolidation volume 518 before exiting the extraction chamber 510 through outlet 512. The ends of the extraction chamber 510 can employ caps 515 for ease of removing spent plant material and loading fresh plant material.

FIG. 6*c*) shows a third configuration of an extraction chamber 520, where the solvent enters through an inlet 521, entering a fluid distribution section 527 that diverts the solvent flow by a non-porous disc 526 to a jacket 524. The solvent is forced through a porous distribution diffuser 523 on the interior of jacket 524 where the fluid flows through the plant material to a central porous filtration tube 525 where the extract solution is directed through outlet 522 that resides on the same end of the extraction chamber 520 as inlet 521. The ends of the extraction chamber 520 can employ caps 528 and 529 for ease of removing spent plant material and loading fresh plant material.

FIG. 6*d*) illustrates an extraction chamber 530, which can have a fluid distribution jacket around an extraction chamber with inlet 531 and outlet 532, such as that shown in FIGS. 6*a*) through 6*c*) or any other design. The jacket permits the circulation of a heating or cooling fluid against the exterior of the extraction chamber 530. The heating fluid can be the liquid solvent exiting the condenser of the heat exchanger. As shown in FIG. 6*d*), fluid can be introduced to the jacket at an inlet 535, fill the jacket, and exit an outlet 536 at the opposing end of the jacket. Optionally, the inlet can be at the base of a ramp 537 having an incline that makes a single revolution about the jacket to the inlet ending immediately above the opening from inlet 535 to promote a circuitous flow of the fluid that spirals up the jacket. The spiral flow can be further encouraged by a similar, optional, additional ramp 538 at the outlet 536 end of the jacket. Jackets or other heating or cooling sources, in reservoirs of the solvent or extract solution, or on conduits, for example, those leading into the extraction chamber or into expansion chambers, can augment providing a heating or cooling fluid on the jackets of the extraction chambers.

Figure 7:
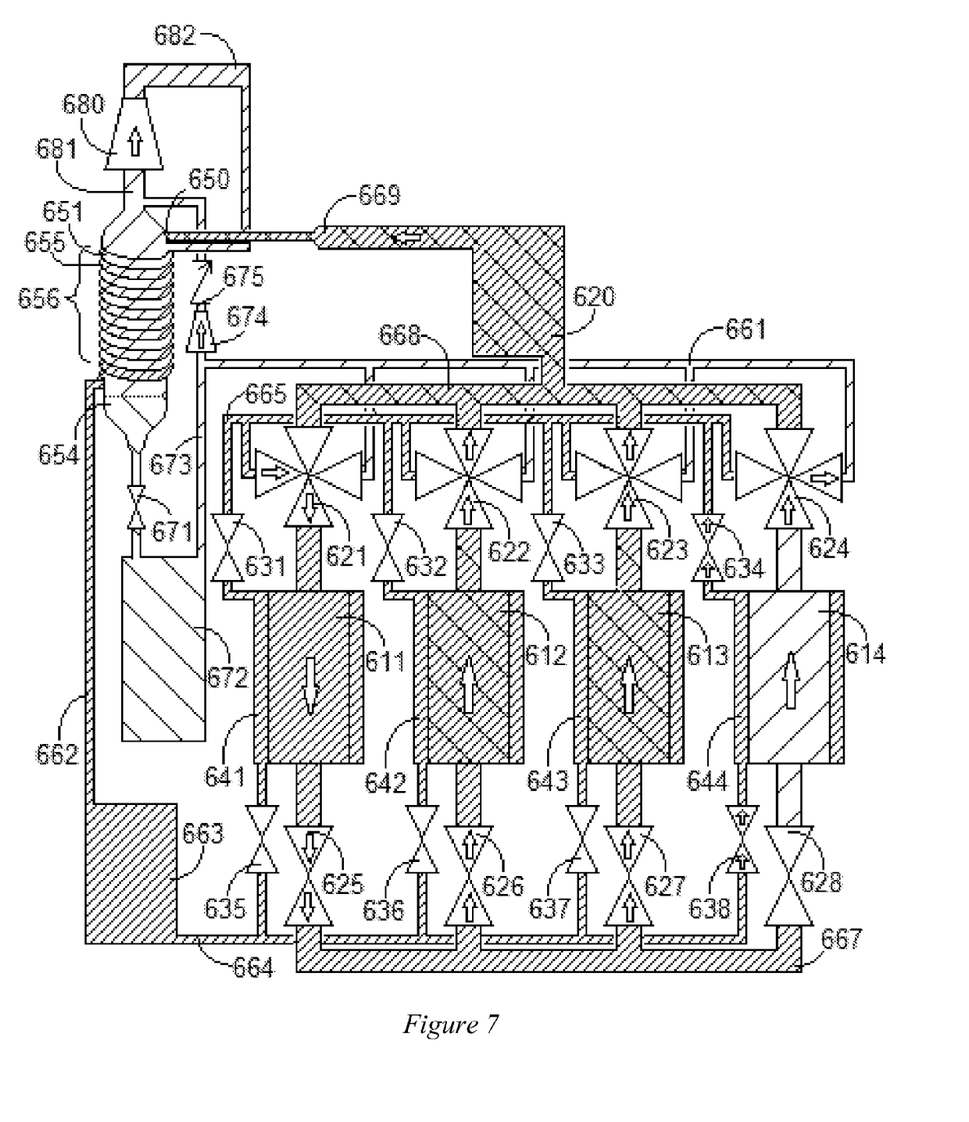
FIG. 7 shows a schematic drawing of a continuous extraction system, according to an embodiment of the invention.

In an embodiment of the invention, a continuous extraction system can be used with nearly any solvent. As illustrated in FIG. 7, the continuous extraction system comprises a multiplicity of jacketed extraction chambers 611, 612, 613, and 614. Fluid from solvent reservoir 663 is directed through conduit 664 to jacket inlet valve 638 with jacket inlet valves 635, 636, and 637, as well as jacket outlet valves 631, 632, and 633, in closed positions to isolate jackets 641, 642, and 643. The solvent exits jacket 644 through jacket outlet valve 634 into conduit 665 that delivers solvent to extraction chamber 611 through valve 621. The plant material of extraction chamber 611 is nearly spent of the extract and, as shown, experience twice the individual fluid flow rate of extraction chambers 612 and 613. Although not necessary, this is advantageous for rapidly removing the last portions of extract on the plant material in extraction chamber 611. The very dilute extract solution exits extraction chamber 611 exits through valve 625 into conduit 667 that feeds extraction chambers 612 and 613 through valves 626 and 627. The concentrated extract solution from extraction chamber 612 and 613 flows through valves 622 and 623 into conduit 668 to extract solution reservoir 620. Extract solution reservoir 620 feeds concentrated extract solution through conduit 669 to the expansion valve 650 of expansion chamber 651 in a heat exchanger 656, which suggests, but is not necessarily, the design shown in FIG. 4 for the heat exchanger.

As illustrated in FIG. 7, the extract drains to the collection port 654 of heat exchanger 656 and drains through extract valve 671 into extract receiver and concentrator 672. Extract valve 671 is periodically opened or is continuously open to a degree that a column of extract resides in the collection port 654 at the inlet of valve 671 throughout operation of the continuous extraction system. Low-pressure solvent vapor is in equilibrium with the extract in the extract receiver and concentrator 672, which is connected via concentrator conduit 673 to concentrating and evacuating compressor 674. On or more plates or baffles can be situated in extract receiver and concentrator 672 to spread wet extract over a larger surface area and increase the rate of solvent evaporation, and/or a stirrer or other mixer can be included in the extract receiver and concentrator 672. Although not shown, a port with a valve permits the removal of extract from the extract receiver and concentrator 672. The outlet of the concentrating and evacuating compressor extract receiver and concentrator 672 is connected to a check valve 675, which forces low-pressure solvent vapor into trap 652 at the inlet 681 of compressor 680 only when the outlet pressure of the concentrating and evacuating compressor 674 exceeds the low-pressure solvent in the extraction chamber inlet 681. This permits generation of a vacuum in the extract receiver and concentrator 672 to remove nearly all solvent from the extract. A vacuum of, for example, 20 Torr, for example, 10 Torr, for example, 5 Torr, for example, 1 Torr or less, can be achieved in the extract receiver and concentrator 672 to allow removal of the extract with almost no solvent therein.

The concentrating and evacuating compressor 674 is also connected through conduit 661 through valve 624 to extraction chamber 614 when valve 628 is closed. Extraction chamber 614 contains completely spent plant material, which is dried by the vacuum created by extract receiver and concentrator 672. The output high-pressure solvent vapor from compressor 680 is directed through conduit 682 to the condenser 655 portion of the heat exchanger 656 with an output of liquid solvent into conduit 662 to liquid solvent receiver 663.

It should be understood that the examples and embodiments described herein are for illustrative purposes only and that various modifications or changes in light thereof will be suggested to persons skilled in the art and are to be included within the spirit and purview of this application.

The invention claimed is:

1. A continuous extraction unit, comprising:
    a plurality of extraction chambers, wherein each of the extraction chambers comprises one or more first valves to direct a fluid flow, and wherein the extraction chamber contains extractable material for extraction of a solute by a solvent to form a solution when under a fluid flow;
    at least one compressor;
    at least one heat exchanger comprising at least one expansion chamber directly contacting at least one condenser, wherein the expansion chamber comprises at least one solution inlet comprising at least one expansion valve that allows a pressure drop that promotes vaporization of the solvent from the solution and aerosolization, coalescence, and consolidation of the solute as an extract in the form of a neat solute or a concentrated solution,
    wherein the solvent in a vaporized state is condensed to a liquid in the condenser, wherein heat from the condenser is absorbed by the expansion chamber, and
    wherein the compressor is positioned upstream with respect to the fluid flow through the condenser and the extraction chambers and the compressor is positioned downstream with respect to the fluid flow through the expansion chamber; and
    at least one pump or at least one second valve for continuously or periodically removing the extract without disruption of the fluid flow, wherein the first valves to direct the fluid flow permit removing one of said plurality of extraction chambers when the extractable material has been depleted of the extract and replacing the extraction chamber that is removed with an equivalent of the extraction chamber containing fresh extractable material without disruption of fluid flow through at least one of the extraction chambers, and wherein the solvent is retained within the continuous extraction unit.

2. The continuous extraction unit of claim 1, further comprising an information processor interfaced with at least one actuator and/or at least one sensor.

3. The continuous extraction unit of claim 2, wherein: the information processor comprises a programmed computer; the sensors comprise, independently or in combination, one or more flow meters, fluid density sensors, refractive index detectors, infra-red, visible or ultraviolet light detectors, and/or conductivity detectors; and the actuators comprise, independently or in combination, one or more valves, pumps, and/or alarms.

4. A method of extracting at least one soluble component from extractable material, comprising:
    providing a continuous extraction unit according to claim 1 having a plurality of extraction chambers containing an extractable material comprising an extractable solute;
    flowing a liquid fluid comprising a solvent through a first conduit into the plurality of extraction chambers, wherein a solution comprising the extractable solute is formed;
    directing flow of the solutions comprising the extractable solute from the extraction chambers into a second conduit, wherein the solutions comprising the extractable solute directed from extraction chambers are combined into a combined solution comprising the extractable solute;
    flowing the combined solution comprising the extractable solute from the second conduit into the at least one solution inlet into the at least one expansion chamber, wherein the expansion chamber is maintained at a lower pressure than the pressure in the second conduit, wherein the combined solution comprising the extractable solute is partitioned into a low pressure solvent vapor and an extract comprising the extractable solute and wherein the low pressure solvent vapor is drawn into an intake of a compressor;
    removing the extract from the continuous extraction unit by at least one pump or valves continuously or periodically without disruption of the fluid flow within the continuous extraction unit;
    compressing the low pressure solvent vapor to a hot high pressure vapor at the output of the compressor;
    condensing the hot high pressure vapor to the liquid comprising a solvent in the condenser, wherein heat from the hot high pressure vapor and heat formed upon condensing is transferred directly to the expansion chamber;
    directing the flow of the liquid fluid comprising a solvent to the first conduit;
    preventing flow of the liquid fluid comprising a solvent from the first conduit into any one of the extraction chambers rendered depleted of extract;
    removing the solvent in the extraction chamber rendered free of extractable solute to the second conduit, the first conduit, and/or other portion of the continuous extraction;
    isolating and removing the extraction chamber rendered depleted of the extract from the continuous extraction unit;
    connecting an equivalent extraction chamber containing extractable material comprising a solute by connection to the first conduit and the second conduit;
    restoring the flow of the liquid fluid comprising a solvent from the first conduit into the equivalent extraction chamber containing extractable material comprising a solute, wherein the solution comprising the extractable solute is formed; and
redirecting flow of the solution comprising the extractable solute from the equivalent extraction chambers into the second conduit.

\* \* \* \* \*